Dec. 11, 1945.  V. R. ABRAMS  2,390,501

FLUID CONDUIT

Filed June 2, 1943

INVENTOR
Victor R. Abrams
BY
C. E. Herrstrom & H. E. Thibodeau
ATTORNEYS

Patented Dec. 11, 1945

2,390,501

UNITED STATES PATENT OFFICE 2,390,501

FLUID CONDUIT

Victor R. Abrams, Detroit, Mich.

Application June 2, 1943, Serial No. 489,362

5 Claims. (Cl. 285—2)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel assembly of a fluid conduit between two spaced members. One of the members may, for example, be the wall of a fuel receptacle carried by a motor vehicle, and the other member may be an outward part such as armor plate or the fender of a passenger vehicle or truck. The conduit for filling the receptacle is designed to pass through the outer member, and frequently the openings for accommodating the conduit are so far out of alignment as to make impossible the insertion of the conduit.

This invention provides an assembly or mounting to overcome this difficulty. Moreover, it is desirable to prevent spill or overflow on the outer member from flowing through the opening and to the inner member. This invention also provides an adjustable packing device for sealing the conduit in the opening of the outer member.

The inner end of the conduit is to be attached to the inner receptacle around the opening thereof. The position of the conduit with respect to this opening is made variable in the radial direction by the use of a washer having two eccentric series of openings. One series is used for attachment to the receptacle and the other for attachment to the conduit. A radial adjustment is selected as determined by the most desirable obtainable position of the conduit in the opening of the outer member.

After this adjustment has been made, the conduit will frequently lie eccentrically in the opening of the outer member. The remaining space is packed by the use of two gaskets fitted one within the other and having eccentric circumferences. The inner gasket is adjusted relatively to the outer gasket until the composite gasket fits and fills the space. A suitable clamping means is provided for spreading the gasket in the space.

The invention is fully disclosed by way of example in the following description and in the accompanying drawing in which.

Reference to these views will now be made by use of like characters which are employed to designate corresponding parts throughout.

Figure 1:
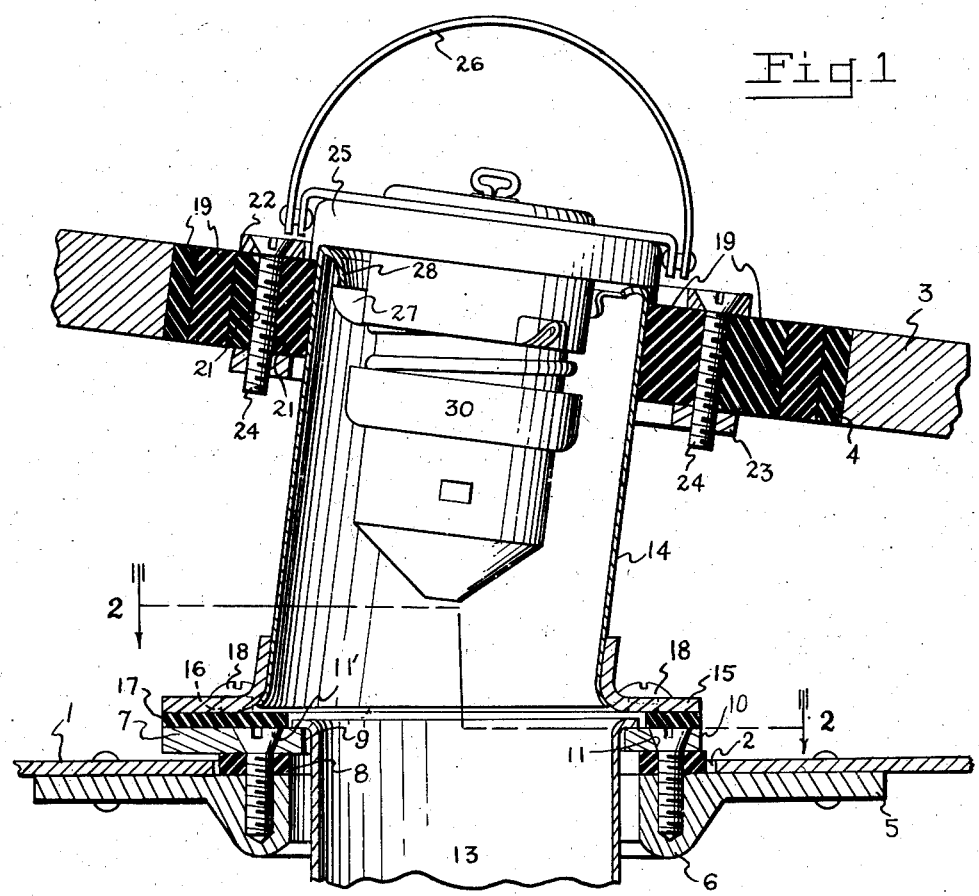
Figure 1 is a vertical section of the device.
Figure 2:
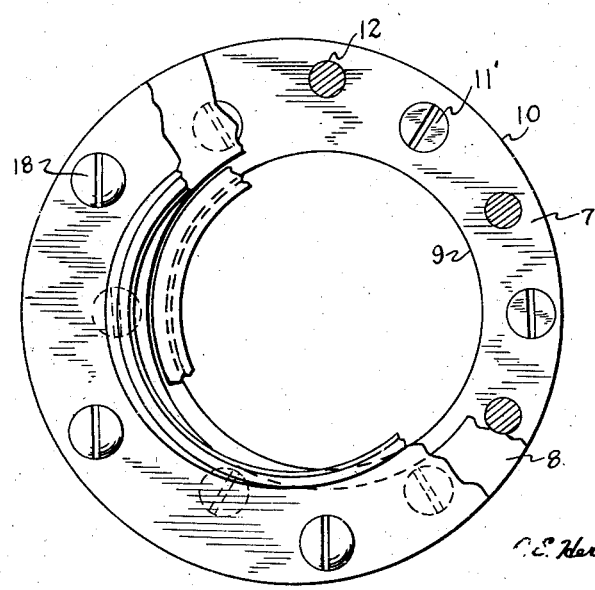
Figure 2 is a section on the line 2—2 of Figure 1.

The numeral 1 indicates the upper surface of the receptacle into which a fluid is to be poured. This member has an opening 2 into which a pouring neck or spout is to be inserted, as will presently be described. Spaced from the surface 1 is an outer sheet or plate member 3 such as the armor of a combat vehicle or the fender of an automobile or truck. The receptacle 1 is to be filled from the outer side of the member 3, and the latter is formed with an oversized opening 4 to accommodate the connecting conduit.

In constructions of this character, and particularly in combat tanks, the openings 2 and 4 are often eccentric to each other in the final assembly because of the rough character of the work or insufficient attention to this detail. Consequently a conduit inserted in the opening 4 might not register properly with the opening 2 or the spout inserted therein.

This condition is corrected by the construction which will now be described. To the lower surface of the member 1 is attached an annular supporting plate 5 having a bead 6 formed at its inner edge and disposed within the confines of the opening 2. A metal washer 7 of special design is mounted over the bead 6 after insertion of a gasket 8 positioned within the opening 2. The washer has eccentric circumferences 9 and 10 and is formed with a series of holes 11 concentric with the inner circumference 9 for attachment to the bead 6, through the gasket 8, by countersunk screws 11. The washer is formed with another series of openings 12 concentric with the outer circumference 10 for attachment of the conduit, as will presently appear. It may be noted for the present that the center of the inner circumference 9 occupies a fixed position because of the concentric relation of the openings 11 thereto and that a rotational adjustment of the washer is equivalent to a lateral shifting of the openings 12.

A spout 13 is suspended from the washer 7 and is suitably secured thereto. A conduit 14 is passed through the opening 4 for connection with the spout 13 at the washer 7. Normally the spout 13 and conduit 14 may be so far out of line that the connection can not be made. Accordingly, the conduit is adjusted in its oversized opening 4 to a position that permits the maximum registration of the members 13 and 14. The conduit 14 has a base flange 15 with a series of holes 16 positioned to register with the holes 12 on rotative adjustment of the washer 7 before assembling. A gasket 17, preferably having its outer circumference coinciding with that of the washer 7, is inserted between this washer and the flange 15, and the parts are secured by bolts 18 fastened in the registering openings 12 and 16.

As a result of this adjustment, the conduit 14 may occupy an eccentric position in the opening 4. It is desired that the opening be packed around the conduit in order to prevent spilled liquid from flowing down on the top of the receptacle 1. For this purpose, a number of nested gaskets 19 are used, each having its outer circumference eccentric to its inner circumference. The outer circumference of any inner gasket is of course equal to the inner circumference of the next outer gasket. The contacting circumferences of two adjacent gaskets are formed at intervals with semi-cylindrical grooves 21 adapted to register and formed with cylindrical bolt openings. The gaskets are adjusted one within the other to fill the opening 4 as completely as possible while bringing the respective grooves 21 into register.

An apertured ring plate 22 and a tapped ring plate 23 are placed at opposite sides of the composite gasket in registration with the bolt holes, and bolts 24 are passed through the ring 22 and screwed into the ring 23. A radial expansion of the gaskets may thus be effected to form a tight packing of conduit 14 within the opening 4.

It will be seen that adjustment or correction is made in two different planes. The reason for the dual adjustment is that the misalignment of the normal openings in the two members is often so wide that it is impossible to make an adequate adjustment or correction at one member only.

A closure cap 25 with a bail 26 is fitted in the outer end of the conduit 14 by any suitable means such as lugs 27 engaging beneath an inturned flange 28 at the upper end of the conduit 14. From the cap is suspended a housing 30 containing a non-spill gas vent as disclosed in my co-pending application Serial No. 462,194, filed October 15, 1942.

This vent is designed to close to avoid spilling when the receptacle 1 assumes an angular position. However, during such a condition, excessive pressure may develop in the receptacle. In order to provide relief under these circumstances, although it may entail spilling, the housing 30 is designed to function as a relief valve.

Although a specific embodiment of the invention has been illustrated and described, it will be understood that various alterations in the details of construction may be made without departing from the scope of the invention as indicated by the appended claims.

What I claim is:

1. Means for providing a fluid path through two spaced members each having an opening therethrough, said means comprising a washer adapted to be mounted on one of said members around its opening, said washer having two circular eccentric series of openings, a conduit adapted for insertion in the opening of the other member, the last named opening being oversized for said conduit, an attaching flange extending from said conduit and having a circular series of openings adapted to register with one of the first named series, the other series of openings in said washer providing means for attachment to the adjacent member, and means for packing the conduit in the opening of the remaining member.

2. Means for providing a fluid path through two spaced members each having an opening therethrough, said means comprising a washer adapted to be mounted on one of said members around its opening, said washer having two circular eccentric series of openings, a conduit adapted for insertion in the opening of the other member, the last named opening being oversized for said conduit, an attaching flange extending from said conduit and having a circular series of openings adapted to register with one of the first named series, the other series of openings in said washer providing means for attachment to the adjacent member, a pair of resilient gaskets with eccentric circumferences fitted one within the other and between said conduit and the periphery of the opening of the remaining member by circumferential adjustment of said gaskets relative to each other to accommodate said conduit in different positions relative to said opening of said remaining member.

3. Means for providing a fluid path through two spaced members each having an opening therethrough, said means comprising a washer adapted to be mounted on one of said members around its opening, said washer having two circular eccentric series of openings, a conduit adapted for insertion in the opening of the other member, the last named opening being oversized for said conduit, an attaching flange extending from said conduit and having a circular series of openings adapted to register with one of the first named series, the other series of openings in said washer providing means for attachment to the adjacent member, a pair of resilient gaskets with eccentric circumferences fitted one within the other and between said conduit and the periphery of the opening of the remaining member by circumferential adjustment of said gaskets relative to each other to accommodate said conduit in different positions relative to said opening of said remaining member, the mutually contacting surfaces of said gaskets having each a series of circumferentially spaced longitudinal passages adapted to register one with the other in different relative positions of circumferential adjustment of said gaskets, pressure plates engaging axially spaced surfaces of said gaskets, and clamping means passing through said plates and through the registering openings.

4. An adjustable device for packing a member in an opening in another member, comprising a pair of resilient gaskets with eccentric circumferences, fitted one within the other and adapted to engage respectively the outer surface of the first named member and the periphery of the opening in the other member and means for expanding said gaskets radially.

5. An adjustable device for packing a member in an opening in another member, comprising a pair of resilient gaskets with eccentric circumferences, fitted one within the other and adapted to engage respectively the outer surface of the first named member and the periphery of the opening in the other member and means for expanding said gaskets radially, the mutually contacting surfaces of said gasket having each a series of longitudinal passages adapted to register one with the other, pressure plates on the flat surfaces of said gaskets, and clamping means passing through said plates and through the registering openings.

VICTOR R. ABRAMS.